United States Patent [19]

Ushida

[11] Patent Number: 5,462,022

[45] Date of Patent: Oct. 31, 1995

[54] VALVE TIMING CONTROL APPARATUS HAVING CYLINDER DISCRIMINATING FUNCTION

[75] Inventor: Masayasu Ushida, Chiryu, Japan

[73] Assignee: Nippondenso Co., Ltd., Japan

[21] Appl. No.: 348,185

[22] Filed: Nov. 29, 1994

[30] Foreign Application Priority Data

Nov. 29, 1993 [JP] Japan ................... 5-298514

[51] Int. Cl.$^6$ ................................................ F01L 1/34
[52] U.S. Cl. ........................ 123/90.17; 123/90.31
[58] Field of Search ..................... 123/90.15, 90.16, 123/90.17, 90.31

[56] References Cited

U.S. PATENT DOCUMENTS

| | | | |
|---|---|---|---|
| 5,144,920 | 9/1992 | Imperial | 123/90.17 |
| 5,209,202 | 5/1993 | Maurer et al. | 123/90.17 |
| 5,271,360 | 12/1993 | Kano et al. | 123/90.17 |
| 5,379,634 | 1/1995 | Kuroda et al. | 123/419 |

FOREIGN PATENT DOCUMENTS

| | | |
|---|---|---|
| 59-105911 | 6/1984 | Japan . |
| 2-308909 | 12/1990 | Japan . |
| 4-228813 | 8/1992 | Japan . |
| 5-10227 | 1/1993 | Japan . |

*Primary Examiner*—Henry C. Yuen
*Assistant Examiner*—Weilun Lo
*Attorney, Agent, or Firm*—Cushman Darby and Cushman

[57] ABSTRACT

A transmitting device is operative for transmitting a rotational force from a crankshaft to a camshaft. A rotational phase adjusting device is operative for adjusting a relative rotational phase between the crankshaft and the camshaft. A crank angle sensor is operative for detecting a rotational angle of the crankshaft, and outputting a rotational angle detection signal indicative thereof. At least one signal inducing member is provided on the camshaft. A cam angle sensor cooperating with the signal inducing member is operative for outputting a cam signal each time the camshaft reaches a predetermined rotational angle. A phase controlling device is operative for monitoring a phase difference between the cam signal and the rotational angle detection signal determined while an arbitrarily-chosen angle of the crankshaft is used as a reference, and for determining an amount of the adjustment by the rotational phase adjusting device so that the monitored phase difference will be equal to a target value. A cylinder discriminating device is operative for setting a discrimination angular range with respect to the rotational angle detection signal outputted by the crank angle sensor. The discrimination angular range is smaller than an angle of 360 degrees of the crankshaft and greater than at least an angular range corresponding to a range of the phase adjustable by the rotational phase adjusting device. The cylinder discrimination device is also operative for discriminating cylinders on the basis of a presence and an absence of the cam signal synchronous with the discrimination angular range.

6 Claims, 8 Drawing Sheets

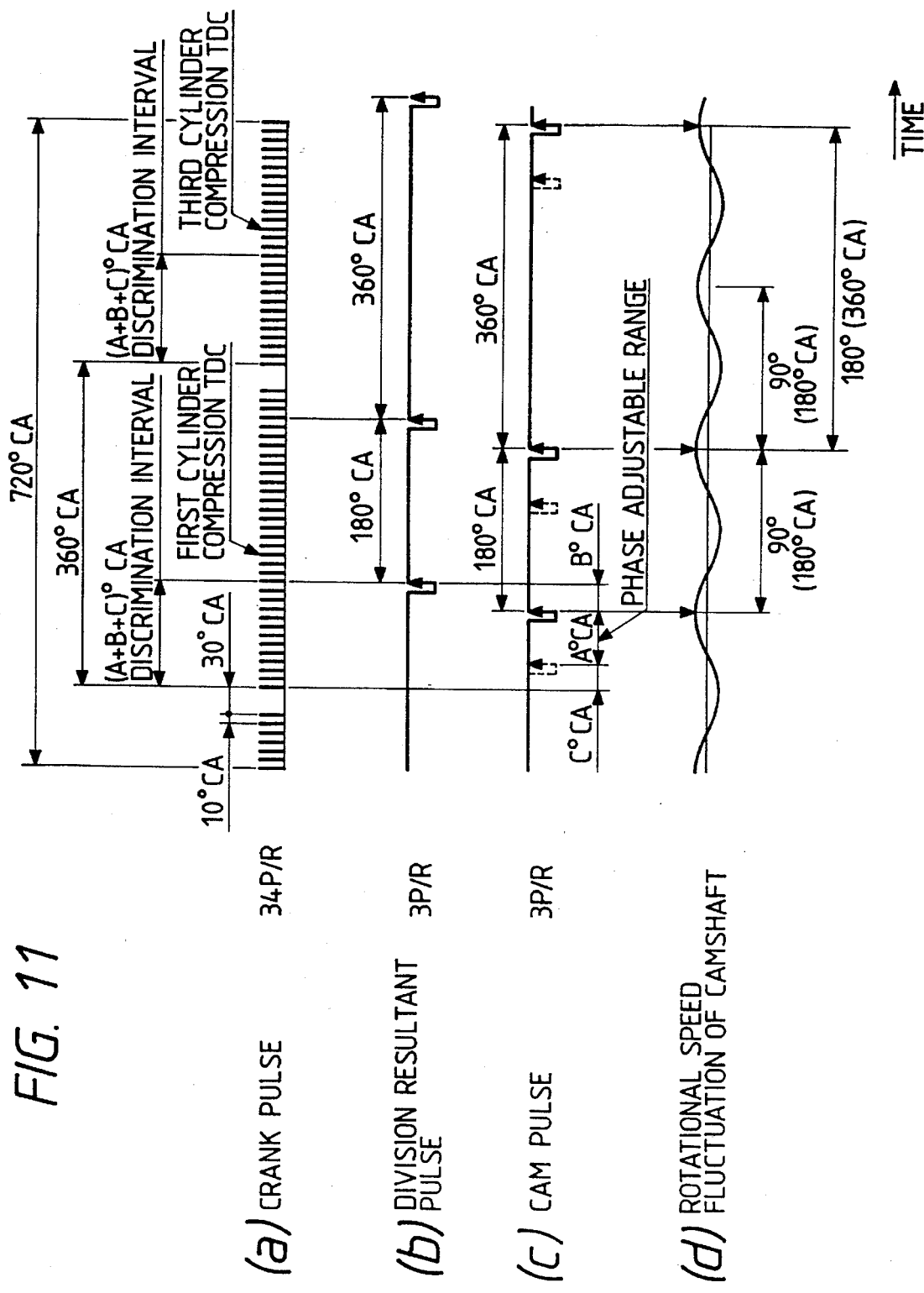

VALVE TIMING CONTROL APPARATUS HAVING CYLINDER DISCRIMINATING FUNCTION

BACKGROUND OF THE INVENTION

1. Field of the Invention

This invention relates to an apparatus for controlling timings of motion of inlet and outlet valves of cylinders in a multiple-cylinder internal combustion engine, the apparatus having a function of discriminating the cylinders with respect to their operation cycles.

2. Description of the Prior Art

Some of internal combustion engines include a crankshaft, a camshaft for cylinder inlet valves, and a camshaft for cylinder outlet valves. The crankshaft is connected to the camshafts by a power transmission mechanism so that the crankshaft will drive the camshafts. Generally, the camshafts rotate at half the speed of rotation of the crankshaft.

Cylinder discriminating apparatuses for multiple-cylinder internal combustion engines detect, for example, which of cylinders will fall into a specified condition in its operation cycle next or which of cylinders will undergo an ignition process next. Generally, the detected information is used in spark timing control or fuel injection control. The cylinder discriminating apparatuses include angular sensors associated with an engine camshaft for detecting the angular position thereof.

Variable valve timing mechanisms for internal combustion engines adjustably vary the angular relation of at least one of engine camshafts with an engine crankshaft.

In the case where both the cylinder discriminating apparatus and the variable valve timing mechanism are provided on an internal combustion engine, the information generated by the angular sensor in the cylinder discriminating apparatus tends to be inaccurate since the variable valve timing mechanism changes the angular relation of an engine camshaft with an engine crankshaft.

Japanese published unexamined patent application 5-10227 discloses a cylinder discriminating apparatus for an internal combustion engine which includes a cylinder discrimination sensor installed on a camshaft. The apparatus of Japanese application 5-10227 is designed to prevent erroneous Judgment of a cylinder in the case where the engine is provided with a variable valve timing mechanism which relatively varies a phase relation between the camshaft and a crankshaft. In the apparatus of Japanese application 5-10227, reading of an output signal of the cylinder discrimination sensor is stopped at the time of switching a valve timing, and the cylinder discrimination is performed based on a cylinder discrimination condition which occurs before the time of switching the valve timing.

SUMMARY OF THE INVENTION

It is an object of this invention to provide an improved valve timing control apparatus having a cylinder discriminating function.

A first aspect of this invention provides a valve timing control apparatus for an internal combustion engine having a rotatable crankshaft, a plurality of cylinders, a rotatable camshaft for opening and closing cylinder inlet valves or cylinder outlet valves, the apparatus having a cylinder discriminating function and comprising transmitting means for transmitting a rotational force from the crankshaft to the camshaft; rotational phase adjusting means associated with the transmitting means for adjusting a relative rotational phase between the crankshaft and the camshaft; a crank angle sensor associated with the crankshaft for detecting a rotational angle of the crankshaft and outputting a rotational angle detection signal indicative thereof; at least one signal inducing means provided on the camshaft; a cam angle sensor cooperating with the signal inducing means for outputting a cam signal each time the camshaft reaches a predetermined rotational angle; phase controlling means for monitoring a phase difference between the cam signal and the rotational angle detection signal determined while an arbitrarily-chosen angle of the crankshaft is used as a reference, and for determining an amount of the adjustment by the rotational phase adjusting means so that the monitored phase difference will be equal to a target value; and cylinder discriminating means for setting a discrimination angular range with respect to the rotational angle detection signal outputted by the crank angle sensor, the discrimination angular range being smaller than an angle of 360 degrees of the crankshaft and being greater than at least an angular range corresponding to a range of the phase adjustable by the rotational phase adjusting means, and for discriminating the cylinders on the basis of a presence and an absence of the cam signal synchronous with the discrimination angular range.

A second aspect of this invention provides an apparatus for an engine having cylinders, a rotatable crankshaft, a rotatable camshaft, and means for rotating the camshaft in response to rotation of the crankshaft, the apparatus comprising means for adjusting a relative rotational phase difference between the crankshaft and the camshaft in a predetermined adjustment angular range; means for setting a predetermined discrimination angular interval with respect to an angular position of the crankshaft, the discrimination angular interval being longer than the adjustment angular range and shorter than an angle of 360° of the crankshaft; means for generating a cam pulse signal when the camshaft reaches a predetermined angular position; means for determining whether or not the cam pulse signal occurs in the discrimination angular interval; and means for detecting which of the cylinders falls into a specified point of its operation cycle in response to a result of said determining by the determining means.

BRIEF DESCRIPTION OF THE DRAWINGS

FIG. 11 is a time-domain diagram of signals and the rotational speed of the inlet valve camshaft in the apparatus of FIG. 9.

DESCRIPTION OF THE PREFERRED EMBODIMENTS

First Embodiment

A first embodiment of this invention is applied to an internal combustion engine having six cylinders in an in-line configuration.

Figure 1:
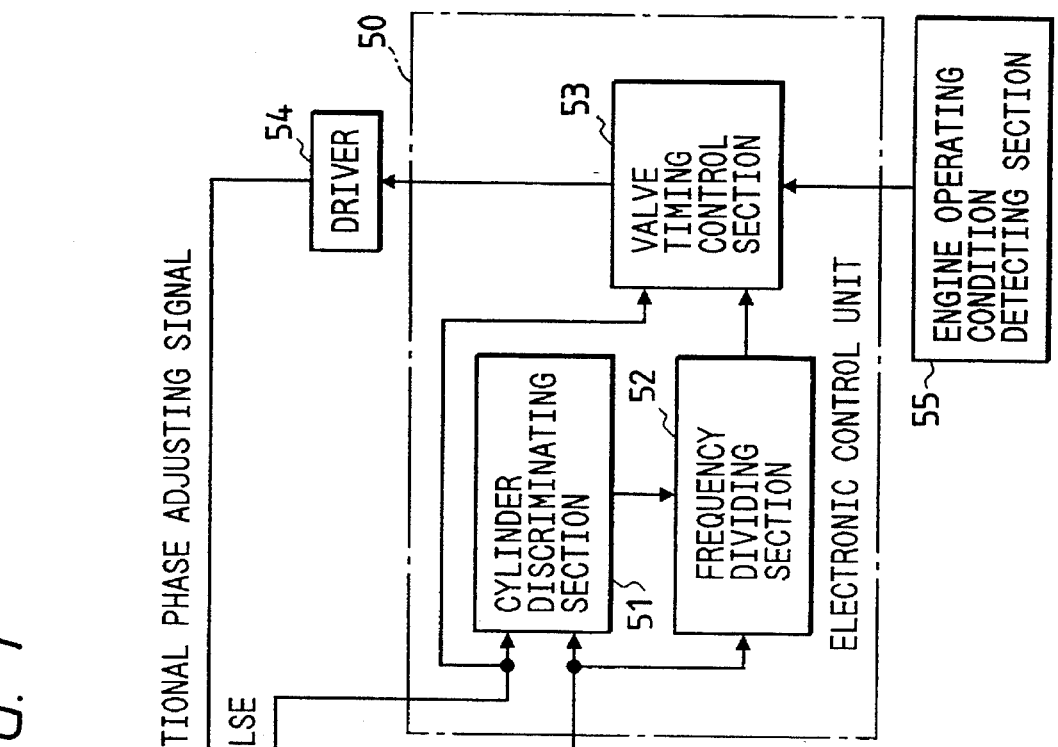
FIG. 1 is a diagram of a valve timing control apparatus according to a first embodiment of this invention.

With reference to FIG. 1, a valve timing control apparatus having a cylinder discriminating function is associated with an engine crankshaft 1 connected via a power transmission mechanism 2 to engine camshafts 3 and 4. The rotational force is transmitted from the crankshaft 1 to the camshafts 3 and 4 via the power transmission mechanism 2. Accordingly, the camshafts 3 and 4 rotate as the crankshaft 1 rotates. The camshaft 3 drives cylinder inlet valves 32. The camshaft 4 drives cylinder outlet valves 42.

The power transmission mechanism 2 includes a pulley 21 mounted on the crankshaft 1, a timing belt 22, a pulley 23 mounted on the inlet valve camshaft 3, and a pulley 24 mounted on the outlet valve camshaft 4. The pulleys 21, 23, and 24 are connected by the timing belt 22. The power transmission mechanism 2 is designed so that the camshafts 3 and 4 rotate at half the speed of rotation of the crankshaft 1.

The inlet valve camshaft 3 is formed with cams 31 for driving the cylinder inlet valves 32 in accordance with the camshaft rotation. The outlet valve camshaft 4 is formed with cams 41 for driving the cylinder outlet valves 42 in accordance with the camshaft rotation.

A known rotational phase adjusting mechanism 6 is incorporated in the pulley 23. The rotational phase adjusting mechanism 6 rotates the pulley 23 and the inlet valve camshaft 3 relative to each other and thereby adjusts the relative rotational phase between the crankshaft 1 and the inlet valve camshaft 3 in response to an externally-applied drive signal (a rotational phase adjusting signal).

As will be made clear later, the relative rotational phase between the crankshaft 1 and the inlet valve camshaft 3 is used as a reference for control of opening and closing timings of the cylinder inlet valves 32 and also cylinder discrimination.

Figure 2:
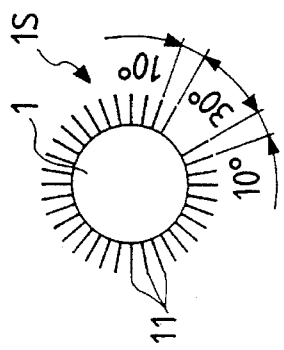
FIG. 2 is a view of an engine crankshaft with pulse inducing members in the apparatus of FIG. 1.

As shown in FIG. 2, the crankshaft 1 is provided with a plurality of pulse inducing members or grooves 11 spaced at equal angular intervals. As shown in FIG. 1, a pulse generator 12 for cooperation with the pulse inducing members 11 is located near the crankshaft 1. When each of the pulse inducing members 11 passes through a region opposing the pulse generator 12, the pulse generator 12 produces and outputs an electric pulse.

The pulse generator 12 includes a suitable sensor such as a magnetic sensor, a Hall sensor, or an optical sensor. The pulse inducing members 11 are made of material or have a shape which enables the production of electric pulses by the pulse generator 12. As shown in FIG. 2, the pulse inducing members 11 compose an array which extends in an angular range of 330° CA (crank angle). In the array, the pulse inducing members 11 are spaced at equal angular intervals which agree with 10° CA (crank angle). A start pulse inducing member 11 and an end pulse inducing member 11 in the array are spaced from each other by an angle of 30° CA (crank angle). The total number of the pulse inducing member 11 is equal to 34.

The pulse inducing members 11 and the pulse generator 12 compose a crank angle sensor 1S An electric pulse outputted from the crank angle sensor 1S, that is, an electric pulse outputted from the pulse generator 12, is referred to as a crank pulse.

Figure 3:
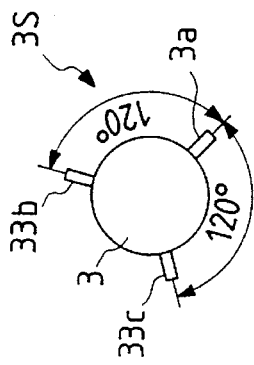
FIG. 3 is a view of an inlet valve camshaft with pulse inducing members in the apparatus of FIG. 1.

As shown in FIG. 3, the inlet valve camshaft 3 is provided with three pulse inducing members 33a, 33b, and 33b spaced at equal angular intervals of 120° corresponding to 240° CA (crank angle). As shown in FIG. 1, a pulse generator 34 for cooperation with the pulse inducing members 33a, 33b, and 33c is located near the inlet valve camshaft 3. When each of the pulse inducing members 33a, 33b, and 33c passes through a region opposing the pulse generator 34, the pulse generator 34 produces and outputs an electric pulse.

The pulse generator 34 includes a suitable sensor such as a magnetic sensor, a Hall sensor, or an optical sensor. The pulse inducing members 33a, 33b, and 33c are made of material or have a shape which enables the production of electric pulses by the pulse generator 34.

The pulse inducing members 33a, 33b, and 33c and the pulse generator 34 compose a cam angle sensor 3S. An electric pulse outputted from the cam angle sensor 3S, that is, an electric pulse outputted from the pulse generator 34, is referred to as an inlet valve cam pulse.

Crank pulses and inlet valve cam pulses outputted from the crank angle sensor 1S and the cam angle sensor 3S are received by an electronic control unit 50. The received crank pulses and inlet valve cam pulses are used in control of opening and closing timings of the cylinder inlet valves 32, cylinder discrimination, spark timing control, and fuel injection timing control.

The electronic control unit 50 includes a hardware such as a microcomputer. The electronic control unit 50 has a cylinder discriminating section 51, a frequency dividing section 52, and a valve timing control section 53.

The cylinder discriminating section 51 executes a cylinder discriminating process in response to a relation between the crank pulses and the inlet valve cam pulses. In the electronic control unit 50, the cylinder discriminating section 51 informs a spark timing control section (not shown) and a fuel injection control section (not shown) of the cylinder discrimination result.

The frequency dividing section 52 receives the crank pulses and divides the frequency of the crank pulses by a predetermined natural number to generate frequency-lowered pulses (division-resultant pulses) having a frequency corresponding to the total number of the pulse inducing members 33a, 33b, and 33c in the cam angle sensor 3S. The frequency division executed by this section 52 is designed so that frequency-lowered pulses (division-resultant pulses) corresponding in frequency to the inlet valve cam pulses can be generated from the crank pulses. For example, the frequency dividing section 52 recognizes or detects a specified crank pulse corresponding to an arbitrarily-chosen reference angle of the crankshaft 1, and starts to count up crank pulses upon the recognition of the specified crank pulse. Each time the counted number of the crank pulses reaches a predetermined number corresponding to 240° CA (crank angle), the frequency dividing section 52 outputs one pulse (a frequency-lowered pulse, a division-resultant pulses).

The valve timing control section 53 receives the inlet valve cam pulses. The valve timing control section 53 also receives the frequency-lowered pulses (the division-resultant pulses) from the frequency dividing section 52. The valve timing control section 53 outputs a rotational phase adjusting signal to the rotational phase adjusting mechanism 6 via a driver 54 so that the phase difference between the inlet valve cam pulses and the frequency-lowered pulses will be equal to a target value θ.

A detecting section 55 detects operating conditions of the engine, and outputs a signal representative thereof to the valve timing control section 53. The valve timing control section 53 determines the target phase difference θ in response to the detected engine operating conditions presented by the detecting section 55. For example, one of the following two ways (A) and (B) is used in the determination of the target phase difference θ.

(A) Optimal target values θ responsive to an engine speed (the rotational speed of the crankshaft 1) and an engine load are previously determined through experiments. Signals representing the optimal target values θ which vary as a function of the engine speed and the engine load are stored in a memory within the valve timing control section 53. The current engine speed and the current engine load are derived from the output signal of the detecting section 55. The signal representative of the target value θ is read out from the memory in response to the current engine speed and the current engine load.

(B) Information related to the pressure within engine cylinders is derived as information of an engine operating condition from the output signal of the detecting section 55. According to a suitable operation program, learning is done of optimal opening and closing timings of the cylinder inlet valves 32 (or the cylinder outlet valves 42) at which the efficiency of the burning of an air-fuel mixture within the engine cylinders is maximized for the engine operating condition. A target value θ corresponding to the optimal valve opening and closing timings is determined in response to the result of the learning process.

A cylinder discriminating process will now be described with reference to FIG. 4. As previously described, the crankshaft 1 is provided with the 34 pulse inducing members 11 arranged in an array extending for an angular range of 330° CA (crank angle). In the array, the pulse inducing members 11 are spaced at equal angular intervals of 10° CA (crank angle). A start pulse inducing member 11 and an end pulse inducing member 11 in the array are spaced from each other by an angle of 30° CA (crank angle). Therefore, the crank angle sensor 1S outputs crank pulses in accordance with the rotation of the crankshaft i as shown in the part (a) of FIG. 4.

The cylinder discriminating section 51 within the electronic control unit 50 measures the periods between the crank pulses, and identifies or detects a specified crank pulse immediately following the 30° CA (crank angle) interval. The cylinder discriminating section 51 sets a fixed discrimination interval (a fixed discrimination angular range) which starts from the moment of the occurrence of the specified crank pulse. Specifically, the discrimination interval is set equal to at least the sum of angles A, B, and C, that is, (A+B+C)° CA, where A denotes the maximum adjustable mount of the rotational phase provided by the rotational phase adjusting mechanism 6; B denotes an angular error in a side where the inlet valve camshaft 3 is relatively retarded, the angular error being caused by the tolerances of members composing the power transmission mechanism 2, the belt expansion and contraction error in the power transmission mechanism 2, and the delays of the transmission of the electric signals; and C denotes an angular error in a side where the inlet valve camshaft 3 is relatively advanced, the angular error being caused by the tolerances of members composing the power transmission mechanism 2, the belt expansion and contraction error in the power transmission mechanism 2, and the delays of the transmission of the electric signals. In addition, the discrimination interval is set smaller than 360° CA.

Figure 4:
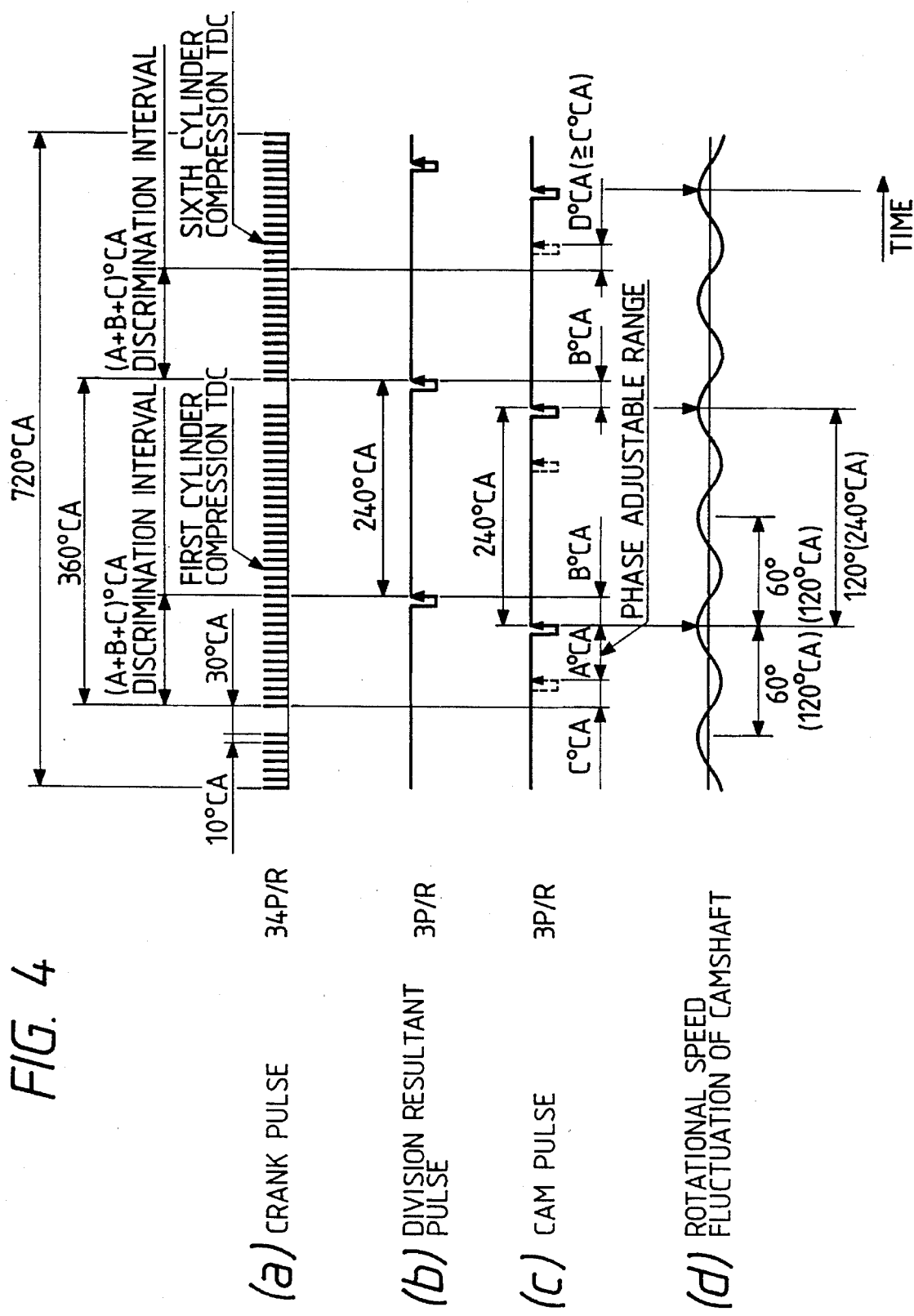
FIG. 4 is a time-domain diagram of signals and the rotational speed of the inlet valve camshaft in the apparatus of FIG. 1.

The inlet valve cam pulses are generated at a timing with respect to the crank pulses as shown in the part (c) of FIG. 4. The inlet valve camshaft 3 rotates once in accordance with every two rotations of the crankshaft 1. There occurs two discrimination intervals during every rotation of the inlet valve camshaft 3. The angle of the location of the cam angle sensor 3S relative to the crank angle sensor 1S is preset so that one inlet valve cam pulse will be outputted from the cam angle sensor 3S in synchronism with one of the two discrimination intervals.

It is now assumed that the ignitions in the engine cylinders of the in-line configuration are preformed in a sequence as: the first cylinder→the fifth cylinder→the third cylinder→the sixth cylinder→the second cylinder→the fourth cylinder. In this case, the assignment of two of the six cylinders to crank pulses can be executed according to the following steps (a) and (b).

(a) In the case where a discrimination interval is recognized as being in synchronism with an inlet valve cam pulse, that is, in the case where a discrimination interval is recognized as containing the moment of the occurrence of an inlet valve cam pulse, the moment of the occurrence of last one of a given number (three in the example of FIG. 4) of crank pulses following the end crank pulse in the discrimination interval is defined as a moment of movement of the piston of the first cylinder into its top dead center at the end of a compression stroke (see the part (a) of FIG. 4).

(b) In the case where a discrimination interval is recognized from which the occurrence of an inlet valve cam pulse is absent, that is, in the case where a discrimination interval is recognized as not containing the moment of the occurrence of an inlet valve cam pulse, the moment of the occurrence of last one of a given number (three in the example of FIG. 4) of crank pulses following the end crank pulse in the discrimination interval is defined as a moment of movement of the piston of the sixth cylinder into its top dead center at the end of a compression stroke (see the part (a) of FIG. 4).

Figure 5:
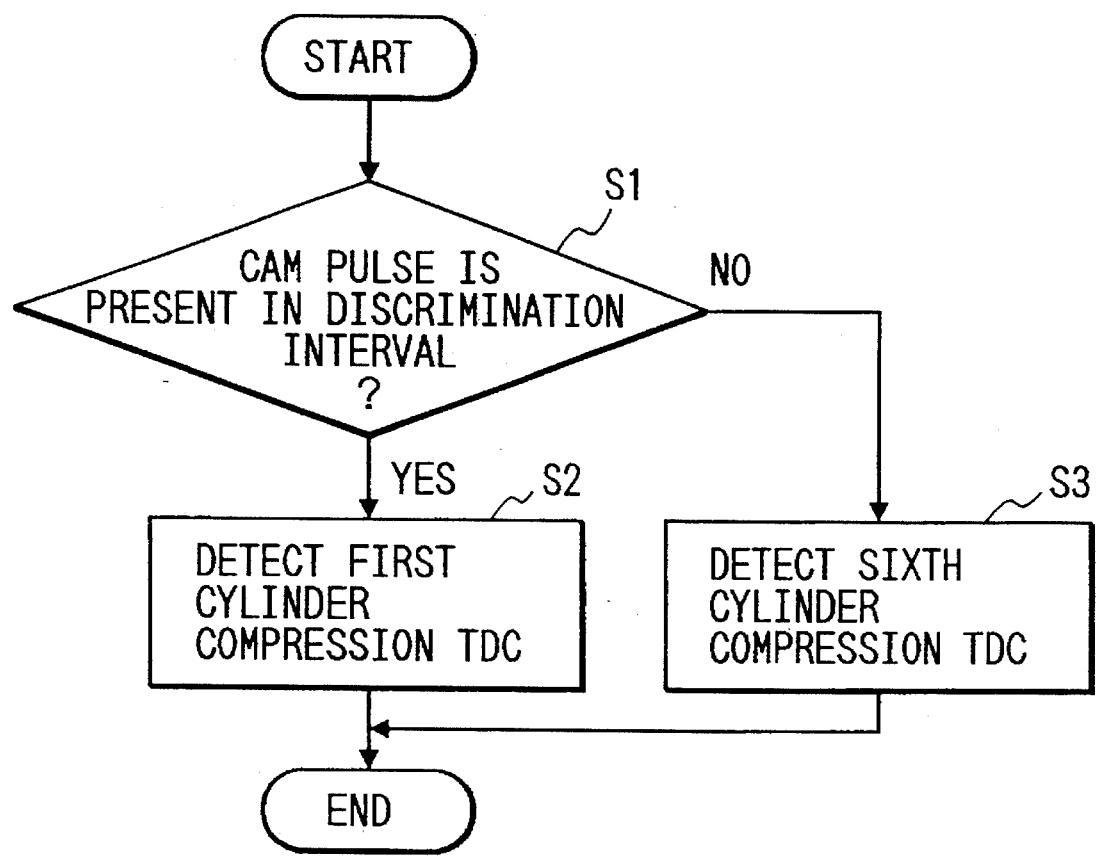
FIG. 5 is a flowchart of a cylinder discriminating program in the apparatus of FIG. 1.

Specifically, the cylinder discriminating section 51 is formed by a microcomputer or a similar device having a combination of an I/O port, a CPU, a RAM, and a ROM. The cylinder discriminating section 51 operates in accordance with a program stored in the ROM. The program is periodically reiterated. FIG. 5 is a flowchart of the program.

As shown in FIG. 5, a first step S1 of the program determines whether or not an inlet valve cam pulse is present in a current discrimination interval. When an inlet valve cam pulse is present in the current discrimination interval, the program advances from the step S1 to a step S2. When an inlet valve cam pulse is absent from the current discrimination interval, the program advances from the step S1 to a step S3. The step S2 counts up crank pulses after the discrimination interval terminates. The step S2 detects the moment of movement of the piston of the first cylinder into its top dead center at the end of a compression stroke by the fact that the counted number of crank pulses reaches a given number (three). After the step S2, the current execution cycle of the program ends. The step S3 counts up crank pulses after the discrimination interval terminates. The step S3 detects the moment of movement of the piston of the sixth cylinder into its top dead center at the end of a compression stroke by the fact that the counted number of crank pulses reaches a given number (three). After the step S3, the current execution cycle of the program ends.

The moments of movement of the pistons of the other cylinders (the second, third, fourth, and fifth cylinders) into their top dead centers at the ends of compression strokes are discriminated and detected by executing an interpolation process responsive to the above-indicated specified crank pulses related to the first and sixth cylinders while considering the cylinder ignition sequence.

With reference to the parts (a) and (c) of FIG. 4, each discrimination interval is set as an angular range containing at least the angles A, B, and C, where A denotes the maximum adjustable amount of the rotational phase provided by the rotational phase adjusting mechanism 6; B denotes an angular error in a side where the inlet valve camshaft 3 is relatively retarded, the angular error being caused by the tolerances of members composing the power transmission mechanism 2, the belt expansion and contraction error in the power transmission mechanism 2, and the delays of the transmission of the electric signals; and C denotes an angular error in a side where the inlet valve camshaft 3 is relatively advanced, the angular error being caused by the tolerances of members composing the power transmission mechanism 2, the belt expansion and contraction error in the power transmission mechanism 2, and the delays of the transmission of the electric signals.

Therefore, even in the case where the relative rotational phase between the crankshaft 1 and the inlet valve camshaft 3 is adjusted by valve timing control described later, an inlet valve cam pulse which has been adjusted once to occur in a discrimination interval is prevented from moving out of the discrimination interval as shown in the part (c) of FIG. 4. Thus, even when the valve timing control is executed, the accuracy of the cylinder discrimination is sufficiently maintained.

In this embodiment, it is preferable that each discrimination interval is equal to or less than 120° CA. This design prevents detection of two inlet valve cam pulses in an overlapped manner.

In an example where an odd number of pulse inducing members spaced at equal angular intervals are provided on the camshaft 3 to generate inlet valve cam pulses, each discrimination interval DI is set to satisfy the following relation.

$$(A+B+C)° \ CA \leq DI \leq 360° \ CA/L$$

where L denotes the total number of the pulse inducing members.

Valve timing control will now be described. Crank pulses are generated in a manner of the part (a) of FIG. 4. The frequency dividing section 52 in the electronic control unit 50 receives the crank pulses, and divides the frequency of the crank pulses to generate division-resultant pulses (frequency-lowered pulses) in a manner of the part (b) of FIG. 4. Specifically, the last crank pulse (the end crank pulse) in a discrimination interval synchronous with an inlet valve cam pulse is specified or designated as a reference crank pulse. Crank pulses following the reference crank pulse are counted up. Each time the counted number of the crank pulses reaches a predetermined number corresponding to 240° CA (crank angle), the frequency dividing section 52 outputs one division-resultant pulse (one frequency-lowered pulse). As shown in the parts (b) and (c), each inlet valve cam pulse advances from a division-resultant pulse (a frequency-lowered pulse) by B° CA to (A+B)° CA. The valve timing control section 53 receives the inlet valve cam pulses and the division-resultant pulses (the frequency-lowered pulses). The valve timing control section 53 executes feedback control of the relative rotational phase between the crankshaft 1 and the inlet valve camshaft 3 in response to the inlet valve cam pulses and the division-resultant pulses (the frequency lowered pulses).

Figure 6:
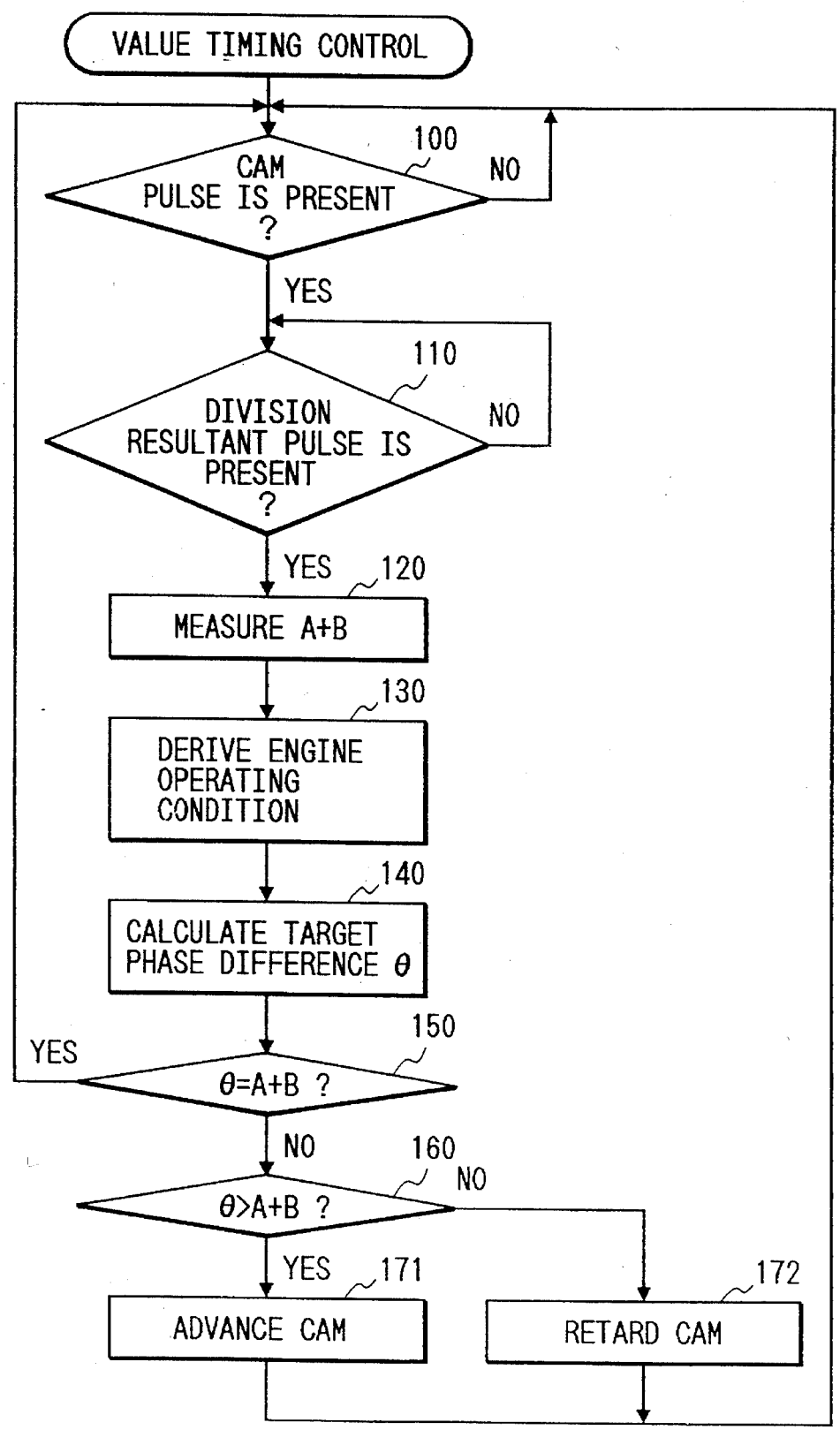
FIG. 6 is a flowchart of a valve timing control program in the apparatus of FIG. 1.

Specifically, the valve timing control section 53 is formed by a microcomputer or a similar device having a combination of an I/O port, a CPU, a RAM, and a ROM. The valve timing control section 53 operates in accordance with a program stored in the ROM. FIG. 6 is a flowchart of the program.

As shown in FIG. 6, a first step 100 of the program determines whether or not an inlet valve cam pulse occurs. When an inlet valve cam pulse occurs, the program advances from the step 100 to a step 110. Otherwise, the step 100 is repeated. The step 110 determines whether or not a division-resultant pulse (a frequency-lowered pulse) occurs. When a division-resultant pulse (a frequency-lowered pulse) occurs, the program advances from the step 110 to a step 120. Otherwise, the step 110 is repeated. The step 120 measures the phase difference (A+B)° CA between the inlet valve cam pulse and the division-resultant pulse.

A step 130 following the step 120 derives current engine operating conditions from the output signal of the detecting section 55. A step 140 following the step 130 calculates a target value θ for the measured phase difference in response to the derived current engine operating conditions. The calculation of the target value θ is based on the previously-described way (A) or (B).

A step 150 following the step 140 compares the measured phase difference (A+B)° CA and the calculated target value θ. Specifically, the step 150 determines whether or not the calculated target value θ is equal to the measured phase difference (A+B)° CA. When the calculated target value θ is equal to the measured phase difference (A+B)° CA, the program returns from the step 150 to the step 100 so that the current rotational phase relation between the crankshaft 1 and the inlet valve camshaft 3 will be unchanged. When the calculated target value θ is not equal to the measured phase difference (A+B)° CA, the program advances from the step 150 to a step 160. The step 160 compares the measured phase difference (A+B)° CA and the calculated target value θ. Specifically, the step 160 determines whether or not the calculated target value θ is greater than the measured phase difference (A+B)° CA. When the calculated target value θ is greater than the measured phase difference (A+B)° CA, the program advances from the step 160 to a step 171. When the calculated target value θ is not greater than the measured phase difference (A+B)° CA, the program advances from the step 160 to a step 172.

The step 171 outputs a rotational phase adjusting signal to the rotational phase adjusting mechanism 6 via the driver 54 so that the relative rotational phase between the crankshaft 1 and the inlet valve camshaft 3 will be adjusted in the direction of advancing the timings of motion of the cylinder inlet valves 31. The step 172 outputs a rotational phase adjusting signal to the rotational phase adjusting mechanism 6 via the driver 54 so that the relative rotational phase between the crankshaft 1 and the inlet valve camshaft 3 will be adjusted in the direction of retarding the timings of motion of the cylinder inlet valves 31. After the steps 171 and 172, the program returns to the step 100.

As a result of cooperation among the steps 150, 160, 171, and 172, the measured phase difference (A+B)° CA is controlled essentially at the target value θ which depends on the engine operating conditions. Therefore, the opening and closing timings of the inlet valves 32 are controlled, in response to the inlet valve cam pulses and the division-resultant pulses, at suitable timings which depend on the engine operating conditions.

As previously described, the inlet valve camshaft 3 is provided with three pulse inducing members 33a, 33b, and 33c spaced at angular intervals of 120°, and an inlet valve cam pulse corresponding to one of the pulse inducing members 33a, 33b, and 33c is generated every 240° CA of the crankshaft 1. Therefore, the inlet valve cam pulses and the division-resultant pulses (the frequency-lowered pulses) are generated at sufficiently short periods, and the valve timing control responsive to these pulses is maintained at a high accuracy.

Since the engine has the six cylinders of the in-line configuration, there are six cylinder inlet valves 32 and also six cylinder outlet valves 42. In addition, there are six cams 31 on the inlet valve camshaft 3 for driving the cylinder inlet valves 32. There are six cams 41 on the outlet valve camshaft 4 for driving the cylinder outlet valves 42.

The six cams 31 on the inlet valve camshaft 3 are spaced at angular intervals of 60° corresponding to 120° CA. Therefore, the inlet valve camshaft 3 is subjected to a rotational speed fluctuation such as shown in the part (d) of FIG. 4 by the driving of the cylinder inlet valves 32. Since the inlet valve camshaft 3 is provided with three pulse inducing members 33a, 33b, and 33c spaced at angular intervals of 120° so that an inlet valve cam pulse corresponding to one of the pulse inducing members 33a, 33b, and 33c is generated every 120° of the inlet valve camshaft 3, the inlet valve cam pulse is synchronous with such a rotational speed fluctuation related to the inlet valve camshaft 3. This synchronization prevents the rotational speed fluctuation on the inlet valve camshaft 3 from adversely affecting the valve timing control.

In this embodiment, although the valve timing control and the cylinder discrimination are simultaneously executed, the accuracy of the cylinder discrimination can be maintained at a high value.

Second Embodiment

Figure 7:
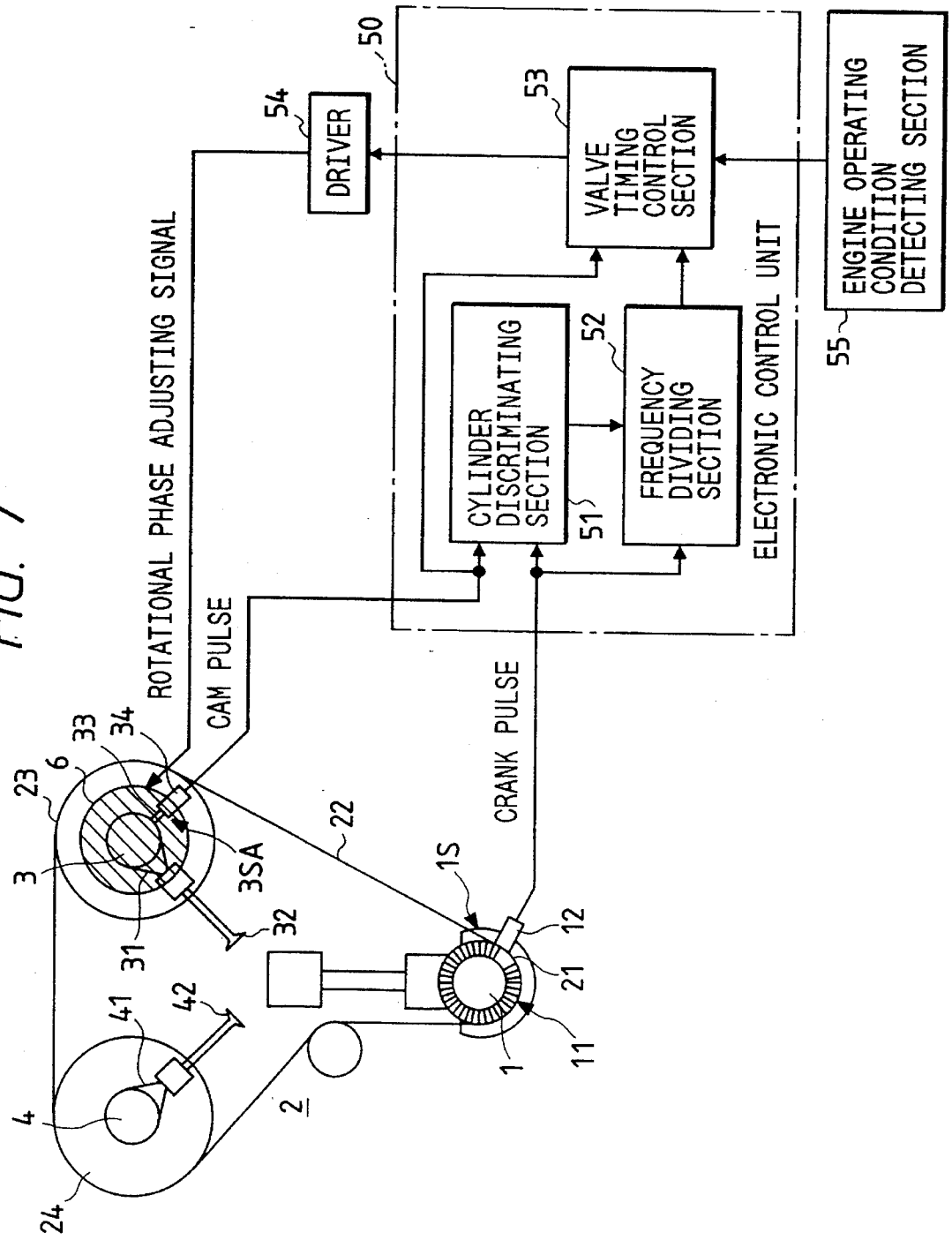
FIG. 7 is a diagram of a valve timing control apparatus according to a second embodiment of this invention.

FIG. 7 shows a second embodiment of this invention which is similar to the embodiment of FIGS. 1–6 except for design changes indicated hereinafter. The embodiment of FIG. 7 includes a cam angle sensor 3SA having only a single pulse inducing member 33 on an inlet valve camshaft 3. As shown in the part (c) of FIG. 8, the cam angle sensor 3SA outputs only one inlet valve cam pulse during one rotation (720° CA) of the inlet valve camshaft 3.

Also in the embodiment of FIG. 7, valve timing control is executed according to a sequence corresponding to the flowchart of FIG. 6.

Figure 8:
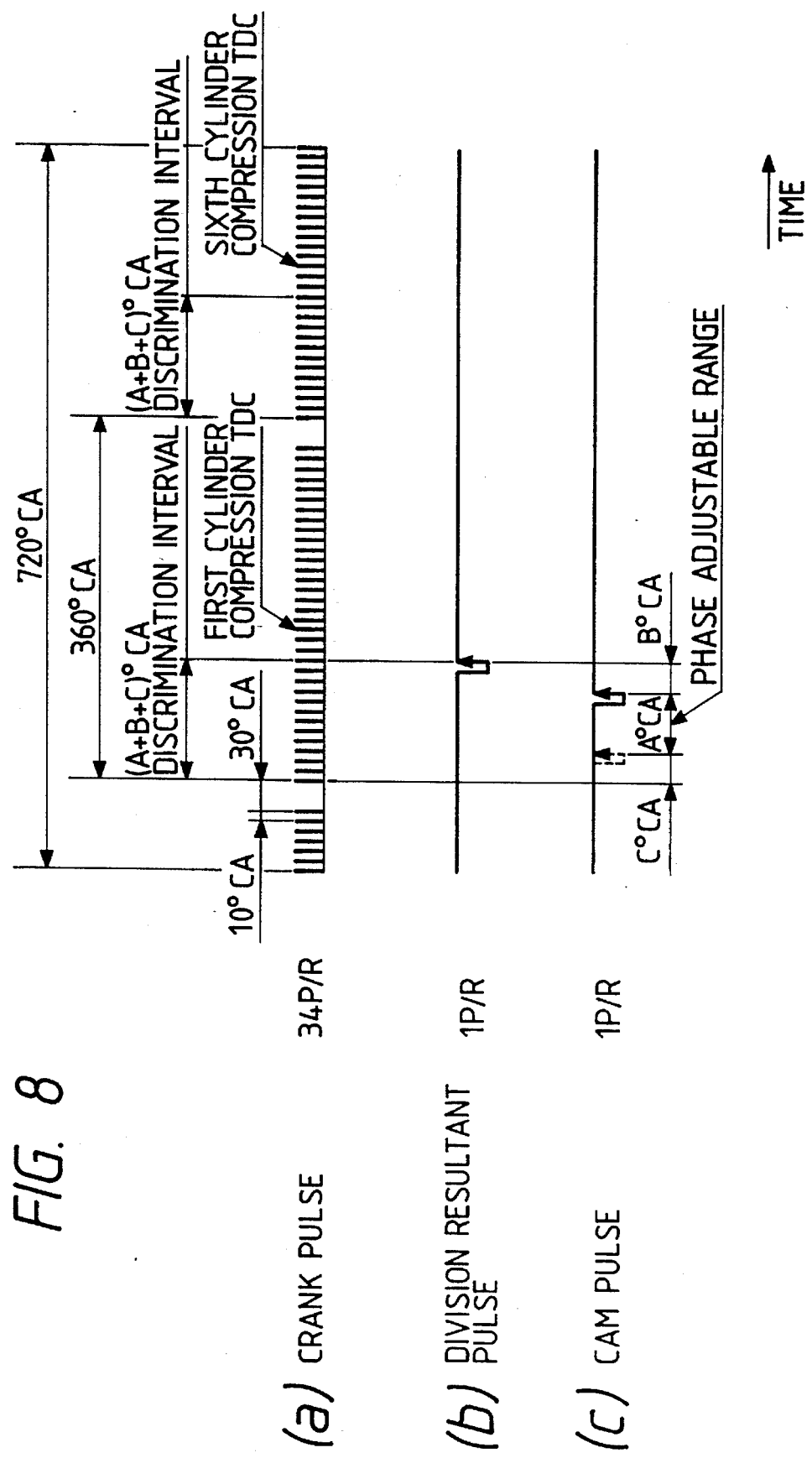
FIG. 8 is a time-domain diagram of signals in the apparatus of FIG. 7.

As shown in the parts (b) and (c) of FIG. 8, a discrimination interval is set equal to at least the sum of angles A, B, and C, that is, (A+B+C)° CA, where A denotes the maximum adjustable amount of the rotational phase provided by a rotational phase adjusting mechanism 6; B denotes an angular error in a side where the inlet valve camshaft 3 is relatively retarded, the angular error being caused by the tolerances of members composing a power transmission mechanism 2, the belt expansion and contraction error in the power transmission mechanism 2, and the delays of the transmission of electric signals; and C denotes an angular error in a side where the inlet valve camshaft 3 is relatively advanced, the angular error being caused by the tolerances of members composing the power transmission mechanism 2, the belt expansion and contraction error in the power transmission mechanism 2, and the delays of the transmission of the electric signals. Therefore, the discrimination interval DI is set as follows.

$$DI \geq (A+B+C)° \ CA$$

Cylinder discrimination is executed on the basis of the presence and absence of an inlet valve cam pulse synchronous with the discrimination interval.

Even in the case where valve timing control for positively adjusting the relative rotational phase between a crankshaft 1 and the inlet valve camshaft 3 is executed in addition to the cylinder discrimination, the accuracy of the cylinder discrimination can be maintained at a high value.

In this embodiment, it is preferable that each discrimination interval is equal to or less than 330° CA. This design prevents detection of two inlet valve cam pulses in an overlapped manner.

Third Embodiment

Figure 9:
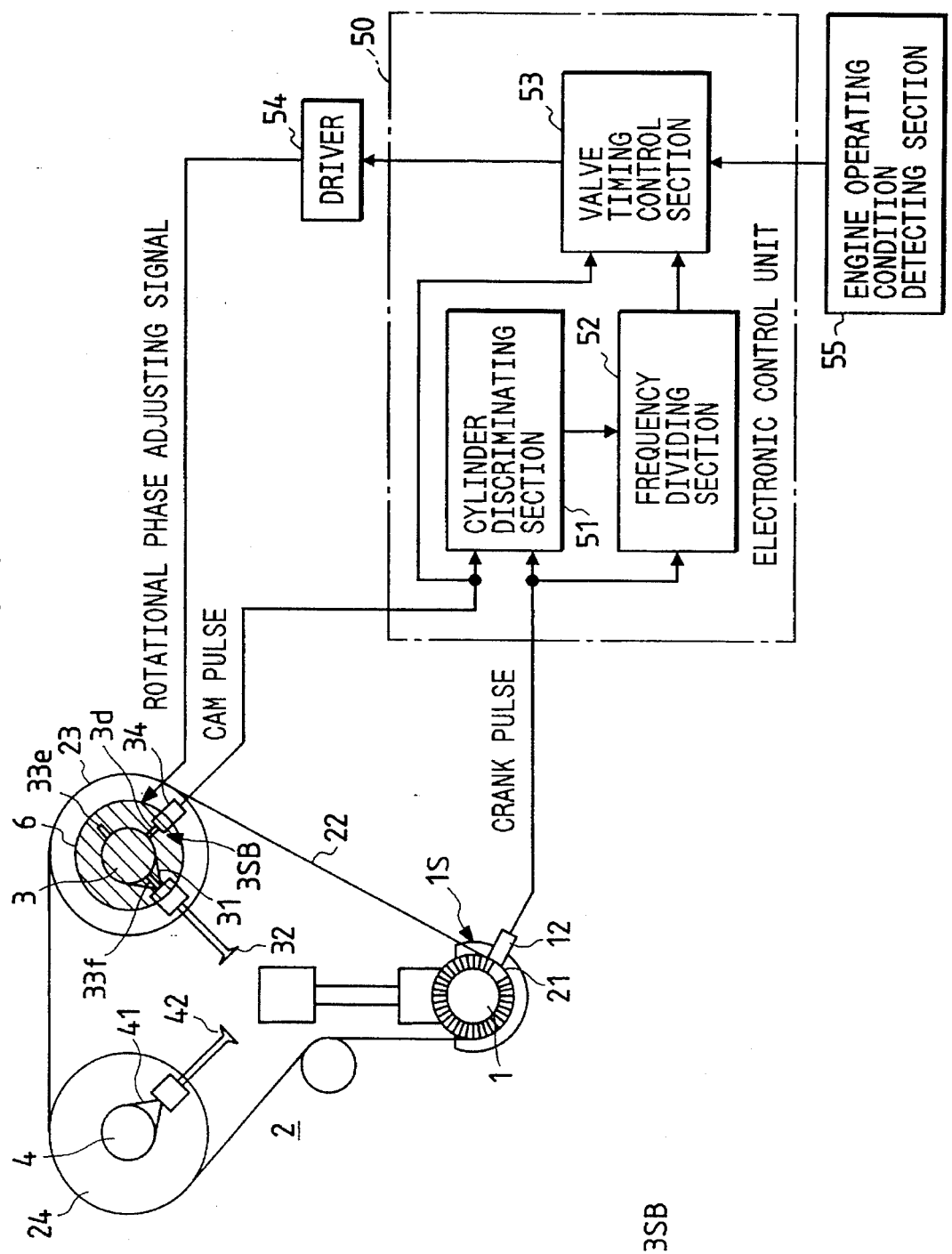
FIG. 9 is a diagram of a valve timing control apparatus according to a third embodiment of this invention.

FIG. 9 shows a third embodiment of this invention which is similar to the embodiment of FIGS. 1–6 except for design changes indicated hereinafter. The embodiment of FIG. 9 includes a cam angle sensor 3SB having three pulse inducing member 33d, 33e, and 33f on an inlet valve camshaft 3.

Figure 10:
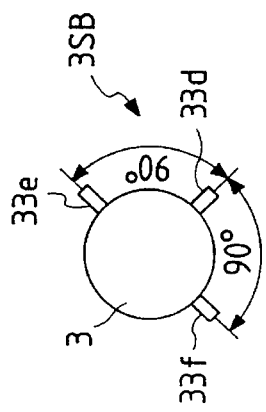
FIG. 10 is a view of an inlet valve camshaft with pulse inducing members in the apparatus of FIG. 9.

As shown in FIG. 10, the pulse inducing members 33d and 33e are spaced from each other by an angle of 90°. The pulse inducing members 33e and 33f are spaced from each other by an angle of 180°. The pulse inducing members 33f and 33d are spaced from each other by an angle of 90°. Therefore, the cam angle sensor 3SB output inlet valve cam pulses which are spaced at unequal intervals as shown in the part (c) of FIG. 11.

A frequency dividing section 52 within an electronic control unit 50 outputs division-resultant pulses (frequency-lowered pulses) in a manner of the part (b) of FIG. 11 in correspondence with the unequally-spaced inlet valve cam pulses.

Also in the embodiment of FIG. 9, valve timing control is executed according to a sequence corresponding to the flowchart of FIG. 6. As previously described, the inlet valve camshaft 3 is provided with three pulse inducing members 33d, 33e, and 33f. Therefore, the inlet valve cam pulses and the division-resultant pulses (the frequency-lowered pulses) are generated at sufficiently short periods, and the valve timing control responsive to these pulses is maintained at a high accuracy.

As shown in the parts (b) and (c) of FIG. 11, a discrimination interval is set equal to at least the sum of angles A, B, and C, that is, (A+B+C)° CA, where A denotes the maximum adjustable amount of the rotational phase provided by a rotational phase adjusting mechanism 6; B denotes an angular error in a side where the inlet valve camshaft 3 is relatively retarded, the angular error being caused by the tolerances of members composing a power transmission mechanism 2, the belt expansion and contraction error in the power transmission mechanism 2, and the delays of the transmission of electric signals; and C denotes an angular error in a side where the inlet valve camshaft 3 is relatively advanced, the angular error being caused by the tolerances of members composing the power transmission mechanism 2, the belt expansion and contraction error in the power transmission mechanism 2, and the delays of the transmission of the electric signals. Therefore, the discrimination interval DI is set as follows.

$$DI \geqq (A+B+C)° \ CA$$

Cylinder discrimination is executed on the basis of the presence and absence of an inlet valve cam pulse synchronous with the discrimination interval.

An inlet valve cam pulse corresponding to the pulse inducing member 33*d* is selected as an inlet valve cam pulse outputted in synchronism with a discrimination interval. This design is effective in simplifying a cylinder discrimination algorithm into a type of FIG. 5 when the rotational speed of the inlet valve camshaft 3 is set equal to half the rotational speed of the crankshaft 1 by a power transmission mechanism 2. The reason for the selection of the inlet valve cam pulse corresponding to the pulse inducing member 33*d* is the absence of a pulse inducing member diametrically-opposed to the pulse inducing member 33*d*. If an inlet valve cam pulse corresponding to the pulse inducing member 33*e* or 33*f* is selected, it is generally difficult to discriminate first and sixth cylinders from each other in a simple way.

Even in the case where valve timing control for positively adjusting the relative rotational phase between a crankshaft 1 and the inlet valve camshaft 3 is executed in addition to the cylinder discrimination, the accuracy of the cylinder discrimination can be maintained at a high value.

As previously described, pulse inducing members on the inlet valve camshaft 3 are spaced at angular intervals equal to multiples of 90°. The third embodiment having this design is preferably applied to an engine having four cylinders or eight cylinders of an in-line configuration to more accurately execute the valve timing control.

For example, in the case of a 4-cylinder engine, there are four cylinder inlet valves 32 and also four cylinder outlet valves 42. In addition, there are four cams 31 on the inlet valve camshaft 3 for driving the cylinder inlet valves 32. There are four cams 41 on an outlet valve camshaft 4 for driving the cylinder outlet valves 42.

The four cams 31 on the inlet valve camshaft 3 are spaced at angular intervals of 90° corresponding to 180° CA. Therefore, the inlet valve camshaft 3 is subjected to a rotational speed fluctuation such as shown in the part (d) of FIG. 11 by the driving of the cylinder inlet valves 32. Since the inlet valve camshaft 3 is provided with three pulse inducing members 33*d*, 33*e*, and 33*f* spaced at angular intervals of 90° (180° CA) and 180° (360° CA) so that inlet valve cam pulses corresponding to the pulse inducing members 33*d*, 33*e*, and 33*f* are generated in synchronism with such a rotational speed fluctuation related to the inlet valve camshaft 3. This synchronization prevents the rotational speed fluctuation on the inlet valve camshaft 3 from adversely affecting the valve timing control.

It is now assumed that the ignitions in the four engine cylinders of the in-line configuration are preformed in a sequence as: the first cylinder→the fourth cylinder→the third cylinder→the second cylinder. In this case, the assignment of two of the four cylinders to crank pulses can be executed according to the following steps (a) and (b).

(a) In the case where a discrimination interval is recognized as being in synchronism with an inlet valve cam pulse, the moment of the occurrence of the end crank pulse in the discrimination interval is defined as a moment of movement of the piston of the first cylinder into its top dead center at the end of a compression stroke (see the part (a) of FIG. 11).

(b) In the case where a discrimination interval is recognized from which the occurrence of an inlet valve cam pulse is absent, the moment of the occurrence of the end crank pulse in the discrimination interval is defined as a moment of movement of the piston of the third cylinder into its top dead center at the end of a compression stroke (see the part (a) of FIG. 11).

Other Embodiments

A first modification of one of the first embodiment, the second embodiment, and the third embodiment includes a cam angle sensor having pulse inducing members, the total number of which is different from either one or three. Providing more than three pulse inducing members in a cam angle sensor is effective in making finer valve timing control.

A second modification of the first embodiment includes a cam angle sensor having a given number of pulse inducing members. An inlet valve cam pulse corresponding to specified one of the pulse inducing members is selected as an inlet valve cam pulse outputted in synchronism with a discrimination interval. The other pulse inducing members are spaced from the specified pulse inducing member by angular intervals different from 180°. This design is effective in simplifying a cylinder discrimination algorithm into a type of FIG. 5 when the rotational speed of an inlet valve camshaft 3 is set equal to half the rotational speed of a crankshaft 1. In the case where pulse inducing members are spaced around an inlet valve camshaft 3 at equal angular intervals, the above-indicated design is provided by setting the total number of the pulse inducing members equal to an odd number.

It should be noted that the total number of pulse inducing members in a cam angle sensor may be equal to an even number. In this case, to provide the above-indicated design, it is preferable that the intervals between the pulse inducing members are unequal.

In addition to the above-indicated design, it is preferable that pulse inducing members in a cam angle sensor are spaced at angular intervals equal to multiples of an angle of 360°/CN where CN denotes the total number of engine cylinders. In this case, a rotational speed fluctuation on an inlet valve camshaft 3 is prevented from adversely affecting valve timing control.

In a third modification of one of the first embodiment, the second embodiment, and the third embodiment, the frequency dividing section 52 is replaced by a device for monitoring the phase difference between an inlet valve cam pulse and a reference crank pulse corresponding to an arbitrarily-chosen angle of a crankshaft 1, or by a device for accumulating the phases of crank pulses following a reference crank pulse in accordance with the result of the counting thereof and estimating the timing of the occurrence of an inlet valve cam pulse in response to the result of the phase accumulation, and calculating the phase difference between the estimated timing and the moment of the occurrence of an actual inlet valve cam pulse.

In a fourth modification of one of the first embodiment, the second embodiment, and the third embodiment, a cam angle sensor and a rotational phase adjusting mechanism are associated with an outlet valve camshaft rather than an inlet valve camshaft.

A fifth modification of one of the first embodiment, the second embodiment, and the third embodiment is applied to an engine different from a DOHC (double overhead camshaft) engine.

What is claimed is:

1. A valve timing control apparatus for an internal combustion engine having a rotatable crankshaft, a plurality of cylinders, a rotatable camshaft for opening and closing cylinder inlet valves or cylinder outlet valves, the apparatus having a cylinder discriminating function and comprising:

transmitting means for transmitting a rotational force from the crankshaft to the camshaft;

rotational phase adjusting means associated with the transmitting means for adjusting a relative rotational phase between the crankshaft and the camshaft;

a crank angle sensor associated with the crankshaft for detecting a rotational angle of the crankshaft and outputting a rotational angle detection signal indicative thereof;

at least one signal inducing means provided on the camshaft;

a cam angle sensor cooperating with the signal inducing means for outputting a cam signal each time the camshaft reaches a predetermined rotational angle;

phase controlling means for monitoring a phase difference between the cam signal and the rotational angle detection signal determined while an arbitrarily-chosen angle of the crankshaft is used as a reference, and for determining an amount of the adjustment by the rotational phase adjusting means so that the monitored phase difference will be equal to a target value; and cylinder discriminating means for setting a discrimination angular range with respect to the rotational angle detection signal outputted by the crank angle sensor, the discrimination angular range being smaller than an angle of 360 degrees of the crankshaft and being greater than at least an angular range corresponding to a range of the phase adjustable by the rotational phase adjusting means, and for discriminating the cylinders on the basis of a presence and an absence of the cam signal synchronous with the discrimination angular range.

2. The valve timing control apparatus of clam 1, wherein the transmitting means is operative for transmitting the rotational force from the crankshaft to the camshaft so that a rotational speed of the camshaft will be equal to half a rotational speed of the crankshaft, and there are a plurality of the signal inducing means on the camshaft, and wherein arbitrary one of the signal inducing means is operative to induce the cam signal synchronous with the discrimination angular range, and the signal inducing members except the arbitrary one are spaced from the arbitrary one by angular intervals different from 180 degrees.

3. The valve timing control apparatus of claim 1, wherein the transmitting means is operative for transmitting the rotational force from the crankshaft to the camshaft so that a rotational speed of the camshaft will be equal to half a rotational speed of the crankshaft, and there are a plurality of the signal inducing means on the camshaft, and wherein arbitrary one of the signal inducing means is operative to induce the cam signal synchronous with the discrimination angular range, and the signal inducing members except the arbitrary one are spaced from the arbitrary one by angular intervals different from 180 degrees and equal to multiples of 360 degrees divided by a total number of the cylinders.

4. The valve timing control apparatus of claim 2 or 3, wherein the signal inducing means on the camshaft are spaced by equal angular intervals, and the cylinder discriminating means is operative for setting a maximum of the discrimination angular range to be within an angular rage equal to an angle of 360 degrees of the crankshaft which is divided by a total number of the signal inducing means.

5. The valve timing control apparatus of claim 1, further comprising:

frequency dividing means for dividing a frequency of the rotational angle detection signal outputted by the crank angle sensor to generate division-resultant signals, a total number of which corresponds to a total number of the signal inducing means;

the phase controlling means is operative for monitoring a phase difference between the division-resultant signal and the cam signal, and for determining an amount of the adjustment by the rotational phase adjusting means in response to the monitored phase difference.

6. An apparatus for an engine having cylinders, a rotatable crankshaft, a rotatable camshaft, and means for rotating the camshaft in response to rotation of the crankshaft, the apparatus comprising:

means for adjusting a relative rotational phase difference between the crankshaft and the camshaft in a predetermined adjustment angular range;

means for setting a predetermined discrimination angular interval with respect to an angular position of the crankshaft, the discrimination angular interval being longer than the adjustment angular range and shorter than an angle of 360° of the crankshaft;

means for generating a cam pulse signal when the camshaft reaches a predetermined angular position;

means for determining whether or not the cam pulse signal occurs in the discrimination angular interval; and means for detecting which of the cylinders falls into a specified point of its operation cycle in response to a result of said determining by the determining means.

* * * * *

UNITED STATES PATENT AND TRADEMARK OFFICE
CERTIFICATE OF CORRECTION

PATENT NO.   : 5,462,022

DATED        : October 31, 1995

INVENTOR(S)  : USHIDA

It is certified that error appears in the above-identified patent and that said Letters Patent is hereby corrected as shown below:

On title page, item [73]
    Change Assignee to read as follows:

--Nippondenso Co., Ltd. and Toyota Jidosha
        Kabushiki Kaisha--

Signed and Sealed this

Second Day of July, 1996

Attest:

BRUCE LEHMAN

Attesting Officer

Commissioner of Patents and Trademarks